US011420588B2

(12) United States Patent
Sekizuka et al.

(10) Patent No.: US 11,420,588 B2
(45) Date of Patent: Aug. 23, 2022

(54) WHEELCHAIR OCCUPANT RESTRAINT DEVICE

(71) Applicant: Toyota Jidosha Kabushiki Kaisha, Toyota (JP)

(72) Inventors: Makoto Sekizuka, Toyota (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/854,259

(22) Filed: Apr. 21, 2020

(65) Prior Publication Data
US 2021/0001800 A1 Jan. 7, 2021

(30) Foreign Application Priority Data

Jul. 4, 2019 (JP) .............................. JP2019-125376

(51) Int. Cl.
| | |
|---|---|
| *A61G 3/08* | (2006.01) |
| *B60R 21/01* | (2006.01) |
| *B60R 22/18* | (2006.01) |
| *B60R 22/343* | (2006.01) |
| *B60R 22/46* | (2006.01) |

(Continued)

(52) U.S. Cl.
CPC .......... *B60R 22/343* (2013.01); *A61G 3/0808* (2013.01); *B60R 21/0132* (2013.01);
(Continued)

(58) Field of Classification Search
CPC . B60R 22/48; B60R 22/24; B60R 2022/1806; B60R 2021/01272;
(Continued)

(56) References Cited

U.S. PATENT DOCUMENTS

| | | | |
|---|---|---|---|
| 4,455,046 A | 6/1984 | Linderoth | |
| 5,431,524 A * | 7/1995 | Antal | ................... A61G 3/0209 296/61 |

(Continued)

FOREIGN PATENT DOCUMENTS

| | | | |
|---|---|---|---|
| EP | 1300303 A1 * | 4/2003 | ............. B60R 22/44 |
| EP | 2570105 A1 | 3/2013 | |

(Continued)

OTHER PUBLICATIONS

U.S. Appl. No. 16/854,308, filed Apr. 21, 2020; Inventors: Makoto Sekizuka et al.

*Primary Examiner* — Paul N Dickson
*Assistant Examiner* — Maxwell L Meshaka
(74) *Attorney, Agent, or Firm* — Dinsmore & Shohl LLP (57) ABSTRACT

A wheelchair occupant restraint device includes: a wheelchair retractor which is disposed in a vehicle cabin, and around which one end portion of a wheelchair belt member is wound; a wheelchair buckle which is disposed on the opposite side of a securing space for a wheelchair from the wheelchair retractor, and on which a wheelchair tongue plate attached to the other end portion of the wheelchair belt member is able to be mounted; an occupant retractor which is disposed on the opposite side of the securing space from the wheelchair retractor, and around which one end portion of an occupant belt member is wound; and an occupant buckle which is disposed on the opposite side of the securing space from the occupant retractor, and on which an occupant tongue plate attached to the other end portion of the occupant belt member is able to be mounted.

14 Claims, 6 Drawing Sheets

(51) Int. Cl.
  *B60R 22/34* (2006.01)
  *B60R 21/0132* (2006.01)
(52) U.S. Cl.
  CPC .......... *B60R 22/18* (2013.01); *B60R 22/3416* (2013.01); *B60R 22/46* (2013.01); *B60R 2021/01272* (2013.01); *B60R 2022/1806* (2013.01)
(58) Field of Classification Search
  CPC ..... B60R 22/18; B60R 22/3416; B60R 22/46; B60R 22/343; A61G 3/08; A61G 3/0808; A61F 5/3792; A61F 5/3776
  See application file for complete search history.

(56) References Cited

U.S. PATENT DOCUMENTS

| | | | | |
|---|---|---|---|---|
| 2007/0228713 | A1* | 10/2007 | Takemura | B60R 22/46 280/753 |
| 2013/0280002 | A1* | 10/2013 | Girardin | B60P 3/079 410/7 |
| 2016/0016499 | A1* | 1/2016 | Hammarskjold | B60P 7/0892 410/7 |
| 2018/0265033 | A1* | 9/2018 | Jaradi | B60R 22/415 |
| 2019/0133853 | A1* | 5/2019 | Girardin | B60R 22/20 |
| 2020/0093662 | A1* | 3/2020 | Mori | B60N 2/3011 |
| 2021/0154063 | A1* | 5/2021 | Ohno | A61G 3/0808 |

FOREIGN PATENT DOCUMENTS

| | | |
|---|---|---|
| FR | 2487751 A2 | 2/1982 |
| JP | H08089532 A | 4/1996 |
| JP | 2001-047969 A | 2/2001 |
| JP | 2002-209946 A | 7/2002 |
| JP | 2002-321591 A | 11/2002 |
| JP | 2007-222278 A | 9/2007 |
| JP | 2011-212392 A | 10/2011 |
| JP | 2018-090143 A | 6/2018 |

* cited by examiner

WHEELCHAIR OCCUPANT RESTRAINT DEVICE

CROSS-REFERENCE TO RELATED APPLICATIONS

This application claims priority to Japanese Patent Application No. 2019-125376 filed on Jul. 4, 2019, which is incorporated herein by reference in its entirety including the specification, drawings and abstract.

BACKGROUND

1. Technical Field

The present disclosure relates to a wheelchair occupant restraint device.

2. Description of Related Art

Japanese Unexamined Patent Application Publication No. 2002-209946 (JP 2002-209946 A) discloses a wheelchair securing device for securing a wheelchair in a vehicle cabin. In JP 2002-209946 A, a belt member is provided on each of the right and left frames of the wheelchair, and the wheelchair is secured by connecting each of the belt members to a securing member on the floor side. In addition, by connecting the right and left belt members with a seat belt, an occupant is restrained by the wheelchair. On the other hand, Japanese Unexamined Patent Application Publication No. H8-89532 (JP H8-89532 A) discloses a fixing device that secures (fixes) a wheelchair in a vehicle cabin by a pair of belt-type restraint means.

SUMMARY

The structure described in JP 2002-209946 A needs a wheelchair in which dedicated belt members are attached to the frames of the wheelchair in advance, so that the versatility is low. As a countermeasure, referring to the technique disclosed in JP H8-89532 A, a method of securing a wheelchair using a two-point seat belt and restraining an occupant further using another two-point seat belt is considered. However, there is room for improvement from the viewpoint of reducing the time needed for securing a wheelchair and restraining an occupant.

The present disclosure provides a wheelchair occupant restraint device that can reduce the time needed for securing a wheelchair and restraining an occupant in view of the above facts.

An aspect of the disclosure relates to a wheelchair occupant restraint device including: a wheelchair retractor which is disposed in a vehicle cabin, and around which one end portion of a wheelchair belt member is wound so as to be pulled out; a wheelchair buckle which is disposed on the opposite side of a securing space for a wheelchair from the wheelchair retractor, and on which a wheelchair tongue plate attached to the other end portion of the wheelchair belt member is able to be mounted; an occupant retractor which is disposed on the opposite side of the securing space from the wheelchair retractor, and around which one end portion of an occupant belt member is wound so as to be pulled out; and an occupant buckle which is disposed on the opposite side of the securing space from the occupant retractor, and on which an occupant tongue plate attached to the other end portion of the occupant belt member is able to be mounted.

In the wheelchair occupant restraint device according to the aspect, the wheelchair retractor is disposed in the vehicle cabin, and the one end portion of the wheelchair belt member is wound around the wheelchair retractor so as to be pulled out. The wheelchair tongue plate is attached to the other end portion of the wheelchair belt member, and the wheelchair tongue plate is able to be mounted on the wheelchair buckle disposed on the opposite side of the securing space for the wheelchair from the wheelchair retractor. Accordingly, when the wheelchair belt member is pulled out from the wheelchair retractor in a state where the wheelchair is moved to the securing space for the wheelchair and the wheelchair tongue plate is mounted on the wheelchair buckle through a frame of the wheelchair or the like, the wheelchair can be secured.

In addition, the occupant retractor is disposed on the opposite side of the securing space from the wheelchair retractor, and one end portion of the occupant belt member is wound around the occupant retractor so as to be pulled out. Furthermore, the occupant tongue plate is attached to the other end portion of the occupant belt member, and the occupant tongue plate is able to be mounted on the occupant buckle disposed on the opposite side of the securing space for the wheelchair from the occupant retractor. Accordingly, when the occupant belt member is pulled out from the occupant retractor and the occupant tongue plate is mounted on the occupant buckle in a state where the wheelchair is secured, the occupant of the wheelchair can be restrained.

Here, the occupant retractor is disposed on the same side as the wheelchair buckle from the securing space. Accordingly, after mounting the wheelchair tongue plate on the wheelchair buckle, the occupant belt member can be subsequently pulled out from the occupant retractor, so that the restraint of the occupant can be performed smoothly.

In the wheelchair occupant restraint device according to the aspect, the occupant retractor and the wheelchair buckle may be disposed at different heights in a vehicle up-down direction.

In the wheelchair occupant restraint device according to the aspect, by disposing the occupant retractor and the wheelchair buckle at different heights, when the wheelchair is secured and thereafter the occupant belt member is pulled out from the occupant retractor to restrain the occupant, the wheelchair belt member is unlikely to be in the way.

In the wheelchair occupant restraint device according to the aspect, the occupant retractor and the wheelchair buckle may be disposed at different positions with respect to the securing space.

In the wheelchair occupant restraint device according to the aspect, by disposing the occupant retractor and the wheelchair buckle at different positions with respect to the securing space, when the wheelchair is secured and thereafter the occupant belt member is pulled out from the occupant retractor to restrain the occupant, the wheelchair belt member is unlikely to be in the way.

The wheelchair occupant restraint device according to the aspect may further include: a buckle sensor configured to detect that the wheelchair tongue plate is mounted on the wheelchair buckle; and a locking mechanism configured to lock and unlock pulling-out of the occupant belt member from the occupant retractor. In a case where the buckle sensor detects that the wheelchair tongue plate is mounted on the wheelchair buckle, the occupant belt member is able to be pulled out by the locking mechanism.

In the wheelchair occupant restraint device according to the aspect, the locked state of the occupant retractor is released by the locking mechanism by mounting the wheelchair tongue plate on the wheelchair buckle. Accordingly, the occupant belt member can be pulled out from the occupant retractor.

In the wheelchair occupant restraint device according to the aspect, the locking mechanism may be configured to electrically switch between locking and unlocking of the occupant belt member.

In the wheelchair occupant restraint device according to the aspect, the structure can be simplified compared to a configuration in which the locking and unlocking of the occupant belt member are mechanically switched.

The wheelchair occupant restraint device according to the aspect may further include an acceleration sensor configured to electrically detect acceleration acting on a vehicle. The occupant retractor may be configured to lock the pulling-out of the occupant belt member in at least one of a case where the acceleration detected by the acceleration sensor is equal to or more than a predetermined value, and a case where an angle of the vehicle with respect to a horizontal is equal to or more than a predetermined value.

In the wheelchair occupant restraint device according to the aspect, in a case where the acceleration (deceleration) acting on the vehicle becomes equal to or more than the predetermined value, for example, at the time of a collision of the vehicle, the pulling-out of the occupant belt member can be locked. In addition, even in a case where the angle (inclination) of the vehicle with respect to the horizontal becomes equal to or more than the predetermined value due to travelling on a steep road or the like, the pulling-out of the occupant belt member can be locked, and the occupant of the wheelchair can be favorably restrained.

In the wheelchair occupant restraint device according to the aspect, the wheelchair retractor and the occupant retractor may be disposed on a standing member standing in the vehicle cabin at a height within reaching distance of a hand of an occupant seated in the wheelchair.

In the wheelchair occupant restraint device according to the aspect, the occupant seated in the wheelchair can pull out the wheelchair belt member from the wheelchair retractor provided on the standing member. Similarly, the occupant seated in the wheelchair can pull out the occupant belt member from the occupant retractor. Here, the "height within reaching distance of the hand of the occupant seated in the wheelchair" refers to a height within reaching distance of the hand of a standard adult female in a state of being seated in the wheelchair.

As described above, with the wheelchair occupant restraint device of the aspect, the time needed for securing the wheelchair and restraining the occupant can be reduced.

With the wheelchair occupant restraint device according to the aspect, the restraint of the occupant can be performed smoothly compared to a structure in which the occupant retractor and the wheelchair buckle are disposed at the same height.

With the wheelchair occupant restraint device according to the aspect, the restraint of the occupant can be performed smoothly compared to a structure in which the occupant retractor and the wheelchair buckle are disposed at the same distance with respect to the securing space.

With the wheelchair occupant restraint device according to the aspect, it is possible to suppress forgetting to secure the wheelchair.

With the wheelchair occupant restraint device according to the aspect, the locking mechanism can be reduced in size compared to a configuration in which locking and unlocking of the occupant belt member are mechanically switched.

With the wheelchair occupant restraint device according to the aspect, the safety performance of the wheelchair for the occupant can be improved.

With the wheelchair occupant restraint device according to the aspect, the wheelchair can be secured by the hand of the occupant seated in the wheelchair.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a wheelchair occupant restraint device 10 according to an embodiment will be described with reference to the drawings. Arrow FR, arrow UP, and arrow RH in each of the drawings respectively indicate a traveling direction (vehicle front side) of a vehicle to which the wheelchair occupant restraint device is applied, a vehicle upper side, and a vehicle right side. In the description using front-rear, right-left, and up-down directions, unless otherwise specified, the front-rear, right-left, and up-down directions indicate forward and rearward in a vehicle front-rear direction, rightward and leftward in a state of being directed in the traveling direction, and upward and downward in a vehicle up-down direction.

Figure 1:
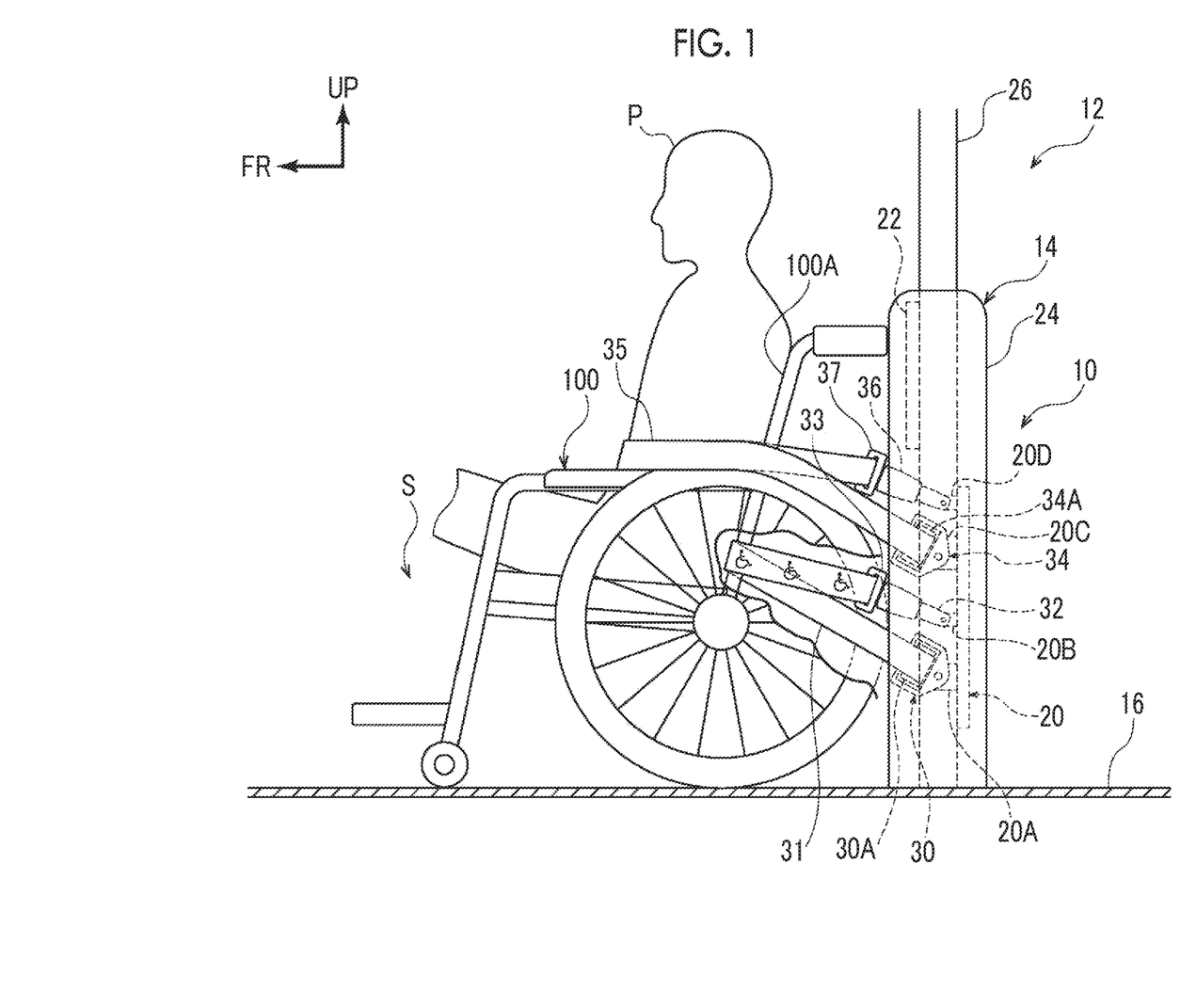
FIG. 1 is a side view of a vehicle cabin of a vehicle to which a wheelchair occupant restraint device according to an embodiment is applied, as viewed in a vehicle width direction.
Figure 2:
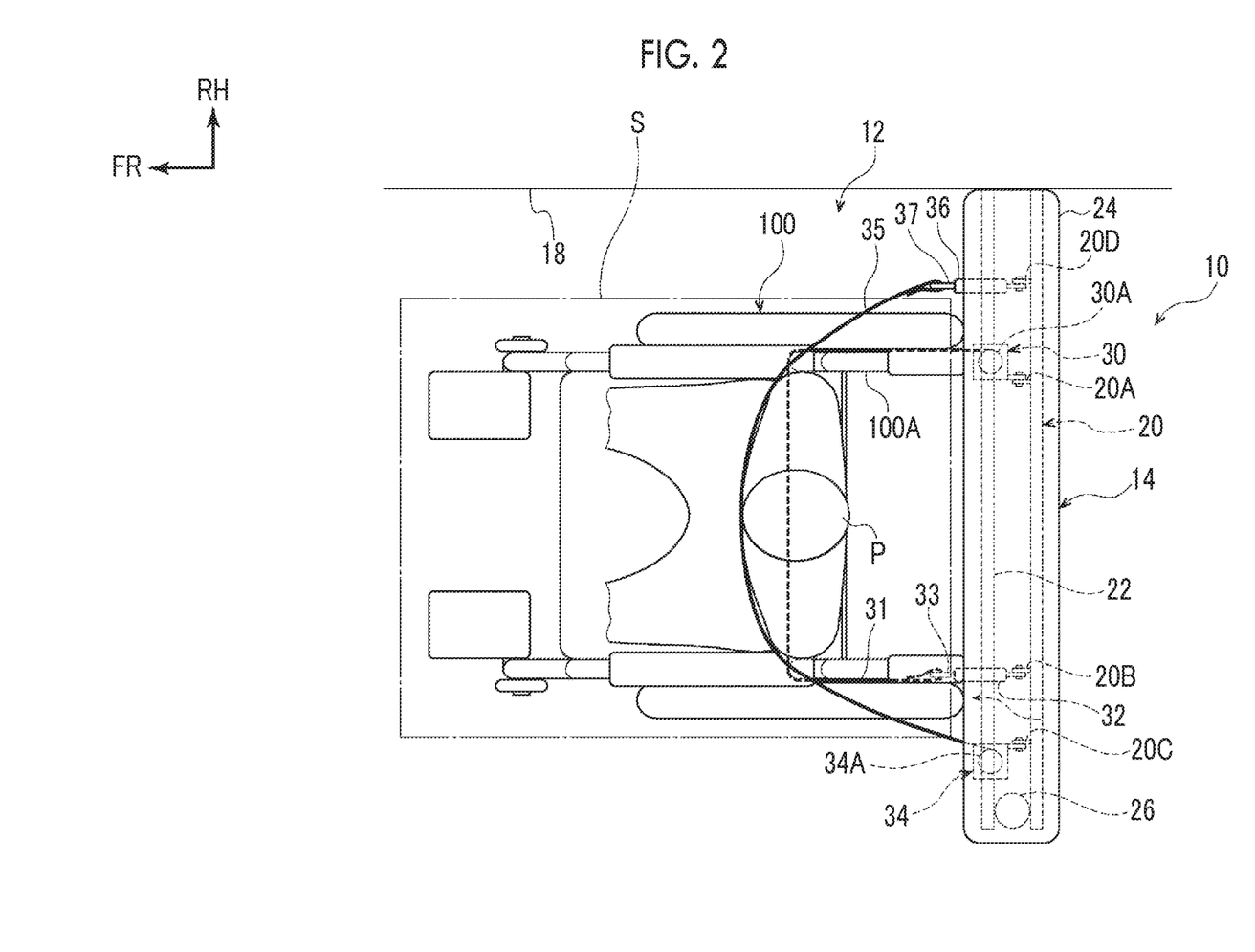
FIG. 2 is a plan view of the vehicle cabin of the vehicle to which the wheelchair occupant restraint device according to the embodiment is applied, as viewed from above the vehicle.

As illustrated in FIGS. 1 and 2, a securing space S for securing a wheelchair 100 is set in a vehicle 12 to which the wheelchair occupant restraint device 10 of the present embodiment is applied. A standing wall 14 is provided as a standing member rearward of the securing space S.

The standing wall 14 stands on a floor panel 16 and extends in the vehicle up-down direction and a vehicle width direction, and is configured to include a belt fixing plate 20, a support plate 22, and a cover 24. The belt fixing plate 20 is located in a lower portion of the standing wall 14, and extends in the vehicle width direction with the vehicle front-rear direction being a plate thickness direction. An end portion of the belt fixing plate 20 on the vehicle right side is fixed to a vehicle cabin side wall 18, and an end portion of the belt fixing plate 20 on the vehicle left side is fixed to a handrail 26 as a standing member standing on the floor panel 16.

The handrail 26 is formed in a substantially columnar shape, and extends to the ceiling of the vehicle 12. In addition, an end portion of the support plate 22 on the vehicle left side is fixed to the handrail 26.

The support plate 22 is located in an upper portion of the standing wall 14 and forms a receiving surface that can support the wheelchair 100 from the vehicle rear side. Specifically, the support plate 22 extends in the vehicle width direction on the side forward of the belt fixing plate 20 with the vehicle front-rear direction being a plate thickness direction. An end portion of the support plate 22 on the vehicle right side is fixed to the vehicle cabin side wall 18, and an end portion of the support plate 22 on the vehicle left side is fixed to the handrail 26 as described above.

The cover 24 is an interior trim and stands on the floor panel 16. The cover 24 covers the entirety of the belt fixing plate 20 and the support plate 22.

Here, a wheelchair retractor 30, a wheelchair buckle 32, an occupant retractor 34, and an occupant buckle 36 are attached to the belt fixing plate 20. In FIG. 1, for convenience of description, the heights of the wheelchair retractor 30 and the wheelchair buckle 32 are illustrated as different heights, but in the present embodiment, the wheelchair retractor 30 and the wheelchair buckle 32 are disposed at substantially the same height. Similarly, the heights of the occupant retractor 34 and the occupant buckle 36 are illustrated as different heights, but in the present embodiment, the occupant retractor 34 and the occupant buckle 36 are disposed at substantially the same height.

A first attachment piece 20A extends from the lower end portion of the belt fixing plate 20 toward the vehicle front side. As illustrated in FIG. 2, the first attachment piece 20A is provided on the vehicle right side of the securing space S. The "vehicle right side of the securing space S" mentioned here indicates the vehicle right side from the center of the securing space S in the vehicle width direction. The wheelchair retractor 30 is fastened to the first attachment piece 20A by bolts and nuts.

As illustrated in FIG. 1, the wheelchair retractor 30 includes a spool 30A, and one end portion of a wheelchair belt member 31 is wound around the spool 30A so as to be pulled out. Since the spool 30A is urged by a return spring (not illustrated) in a direction in which the wheelchair belt member 31 is wound, the wheelchair belt member 31 is in a state of being wound around the wheelchair retractor 30 in a no-load state except for the other end portion. Here, in the present embodiment, as an example, the wheelchair retractor 30 is fastened to the first attachment piece 20A in a state of being inclined so that the wheelchair belt member 31 is obliquely pulled out toward the vehicle front side and the vehicle upper side.

In addition, the wheelchair retractor 30 has an automatic locking mechanism (automatic locking retractor (ALR)) in which a locking mechanism is activated when the wheelchair belt member 31 is pulled out to the end to lock the wheelchair belt member 31 at a returned position, and the wheelchair belt member 31 cannot be pulled out again when the wheelchair belt member 31 is not returned to the end. Furthermore, the wheelchair retractor 30 has an emergency locking mechanism (emergency locking retractor (ELR)) in which pulling-out of the wheelchair belt member 31 is limited when the wheelchair belt member 31 is pulled out suddenly, such as at the time of a collision of the vehicle 12.

The wheelchair belt member 31 is formed in a long shape with the same cloth material as the webbing for restraining an occupant P. That is, the wheelchair belt member 31 is formed of the same cloth material as an occupant belt member 35, which will be described later. In the present embodiment, as an example, a mark imitating a wheelchair is drawn on one surface of the wheelchair belt member 31 so that the wheelchair belt member 31 can be intuitively recognized as a belt for securing the wheelchair 100. Furthermore, a wheelchair tongue plate 33 is attached to the other end portion of the wheelchair belt member 31.

As illustrated in FIG. 2, a second attachment piece 20B is provided on the vehicle left side from the first attachment piece 20A. Similarly to the first attachment piece 20A, the second attachment piece 20B extends from the lower end portion of the belt fixing plate 20 toward the vehicle front side, and the wheelchair buckle 32 is fastened to the second attachment piece 20B by bolts and nuts.

The wheelchair buckle 32 is disposed on the opposite side of the securing space S from the wheelchair retractor 30, and the wheelchair tongue plate 33 can be mounted on the wheelchair buckle 32. The wheelchair buckle 32 is provided with a buckle sensor 64 that detects that the wheelchair tongue plate 33 is mounted on the wheelchair buckle 32 (see FIG. 3). Here, the "opposite side of the securing space S from the wheelchair retractor 30" indicates the opposite side of the center of the securing space S in the vehicle width direction from the wheelchair retractor 30. Furthermore, in order for the wheelchair tongue plate 33 to be easily mounted, the wheelchair buckle 32 of the present embodiment is fastened to the second attachment piece 20B in a state of being inclined so that an insertion hole of the wheelchair tongue plate 33 is obliquely directed toward the vehicle front side and the vehicle upper side.

FIGS. 1 and 2 illustrate a state where the wheelchair tongue plate 33 is mounted on the wheelchair buckle 32 through a frame 100A of the wheelchair 100, and the wheelchair 100 is secured in this state.

A third attachment piece 20C is provided on the vehicle left side from the second attachment piece 20B. The third attachment piece 20C extends from the upper end portion of the belt fixing plate 20 toward the vehicle front side, and the occupant retractor 34 is fastened to the third attachment piece 20C by bolts and nuts. That is, the occupant retractor 34 and the wheelchair buckle 32 are disposed at different positions with respect to the securing space S. In the present embodiment, the occupant retractor 34 is disposed at a position farther from the securing space S than the wheelchair buckle 32. In addition, the occupant retractor 34 and the wheelchair buckle 32 are disposed at different heights in the vehicle up-down direction. In the present embodiment, the occupant retractor 34 is disposed above the wheelchair buckle 32 in the vehicle up-down direction.

As illustrated in FIG. 1, the occupant retractor 34 includes a spool 34A, and one end portion of the occupant belt member 35 is wound around the spool 34A so as to be pulled out. Since the spool 34A is urged by a return spring (not illustrated) in a direction in which the occupant belt member 35 is wound, the occupant belt member 35 is in a state of being wound around the occupant retractor 34 in a no-load state except for the other end portion. Here, in the present embodiment, as an example, the occupant retractor 34 is fastened to the third attachment piece 20C in a state of being inclined so that the occupant belt member 35 is obliquely pulled out toward the vehicle front side and the vehicle upper side.

In addition, the occupant retractor 34 has an emergency locking mechanism (emergency locking retractor (ELR)) in which pulling-out of the occupant belt member 35 is limited when the occupant belt member 35 is pulled out suddenly, such as at the time of a collision of the vehicle 12.

Furthermore, the occupant retractor 34 includes a locking mechanism 62 that locks and unlocks the pulling-out of the occupant belt member 35. The locking mechanism 62 is configured to be electrically switched between locking and unlocking of the occupant belt member 35 (see FIG. 3). In the present embodiment, as such a locking mechanism, the locking mechanism 62 using a solenoid and a locking lever is adopted. In the locking mechanism 62, by energizing the solenoid, the locking lever is moved to cause the spool 34A to be in an unlocked state, and in a case where the solenoid is not energized, the locking lever moves to the opposite side to cause the spool 34A to be in a locked state.

As illustrated in FIG. 2, a fourth attachment piece 20D is provided on the vehicle right side from the first attachment piece 20A. Similarly to the third attachment piece 20C, the fourth attachment piece 20D extends from the upper end portion of the belt fixing plate 20 toward the vehicle front side, and the occupant buckle 36 is fastened to the fourth attachment piece 20D by bolts and nuts. That is, the occupant buckle 36 is disposed at a position farther from the securing space S than the wheelchair retractor 30. In addition, the occupant buckle 36 is disposed above the wheelchair retractor 30 in the vehicle up-down direction.

The occupant buckle 36 is disposed on the opposite side of the securing space S from the occupant retractor 34. In addition, an occupant tongue plate 37 attached to the other end portion of the occupant belt member 35 can be mounted on the occupant buckle 36. Furthermore, in order for the occupant tongue plate 37 to be easily mounted, the occupant buckle 36 of the present embodiment is fastened to the fourth attachment piece 20D in a state of being inclined so that an insertion hole of the occupant tongue plate 37 is obliquely directed toward the vehicle front side and the vehicle upper side.

As described above, in the present embodiment, the wheelchair retractor 30, the wheelchair buckle 32, the occupant retractor 34, and the occupant buckle 36 are disposed on the belt fixing plate 20 included in the standing wall 14. Therefore, the wheelchair retractor 30, the wheelchair buckle 32, the occupant retractor 34, and the occupant buckle 36 are within reaching distance of the hand of the occupant P seated in the wheelchair 100.

Figure 3:
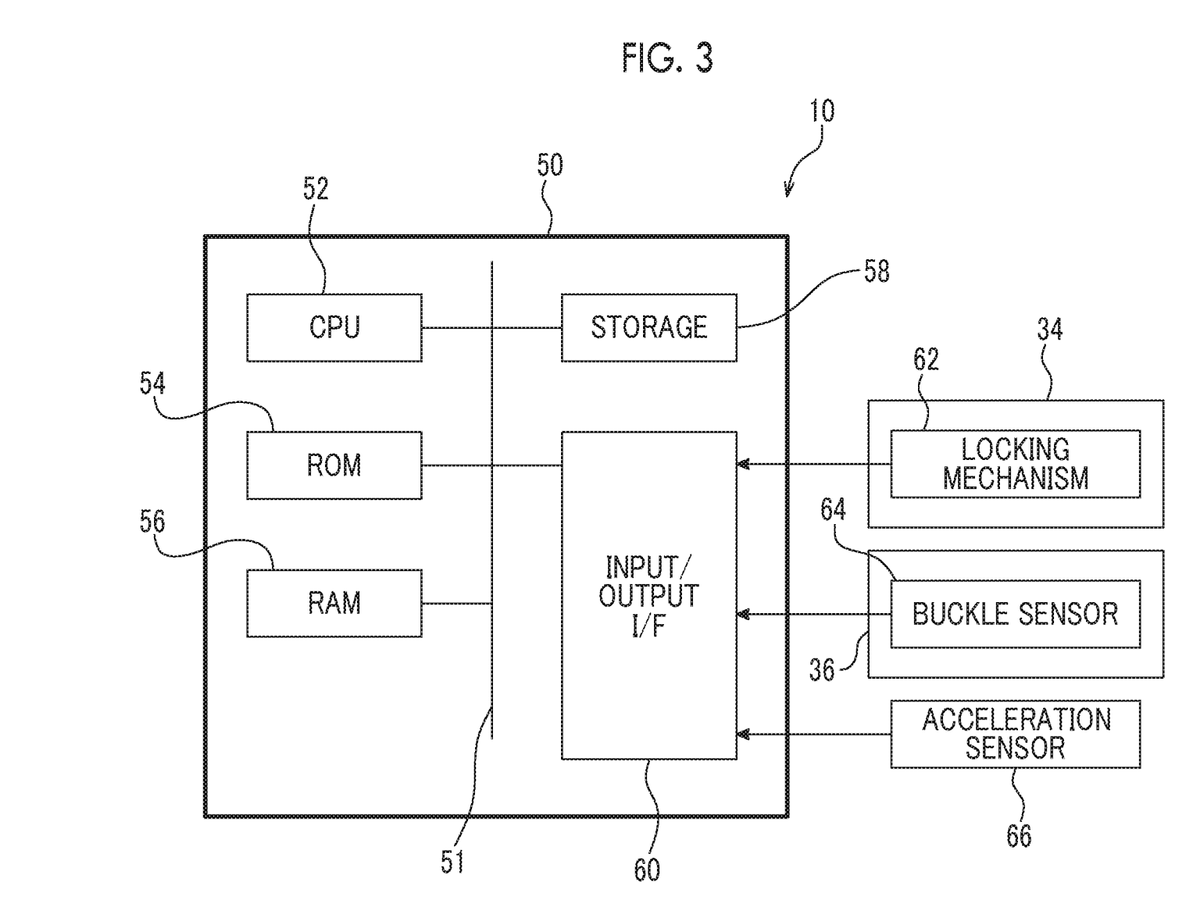
FIG. 3 is a block diagram showing a hardware configuration of the wheelchair occupant restraint device according to the embodiment.

FIG. 3 is a block diagram illustrating a hardware configuration of the wheelchair occupant restraint device 10. As shown in FIG. 3, the wheelchair occupant restraint device 10 includes an electrical control unit (ECU) 50 which is a controller. The ECU 50 includes a central processing unit (CPU) 52, a read only memory (ROM) 54, a random access memory (RAM) 56, a storage 58, and an input/output interface 60. The components are connected via a bus 51 so as to communicate with each other.

The CPU 52 is a central processing unit, and executes various programs or controls each unit. That is, the CPU 52 reads a program from the ROM 54 or the storage 58 and executes the program using the RAM 56 as a work area. The CPU 52 controls the above components and performs various arithmetic processes according to the program recorded on the ROM 54 or the storage 58.

The ROM 54 stores various programs and various data. The RAM 56 temporarily stores a program or data as a work area. The storage 58 is configured by a hard disk drive (HDD) or a solid state drive (SSD), and stores various programs including an operating system and various data. In the present embodiment, the ROM 54 or the storage 58 stores a lock switching processing program for switching the locking mechanism 62 in a case where the occupant P is restrained, a lock switching processing program for switching the locking mechanism 62 in an emergency in a state where the occupant is restrained, and the like.

The locking mechanism 62 (occupant retractor 34) and the buckle sensor 64 (wheelchair buckle 32) are connected to the input/output interface 60. In addition, an acceleration sensor 66 that electrically detects acceleration (deceleration) acting on the vehicle 12 is connected to the input/output interface 60. As an example, the acceleration sensor 66 of the present embodiment is configured to be able to electrically detect acceleration on two axes of forward, rearward, rightward, and leftward directions. Then, the occupant retractor 34 is controlled based on a signal from the ECU 50.

Example of Lock Switching Processing

Here, in a case where the buckle sensor 64 detects that the wheelchair tongue plate 33 is mounted on the wheelchair buckle 32, the ECU 50 enables the occupant belt member 35 to be pulled out by the locking mechanism 62. In addition, in at least one of a case where the acceleration detected by the acceleration sensor 66 is equal to or more than a predetermined value and a case where the angle (inclination) of the vehicle 12 with respect to the horizontal is equal to or more than a predetermined value, the ECU 50 causes the locking mechanism 62 to lock the pulling-out of the occupant belt member 35. An example of the lock switching processing will be described with reference to the flowcharts in FIGS. 4 and 5. This lock switching processing is executed by the CPU 52 reading out the lock switching program from the ROM 54 or the storage 58, and deploying and executing the program on the RAM 56. First, the lock switching processing in the case where the occupant P is restrained will be described with reference to FIG. 4, and subsequently the lock switching processing in an emergency will be described with reference to FIG. 5.

Figure 4:
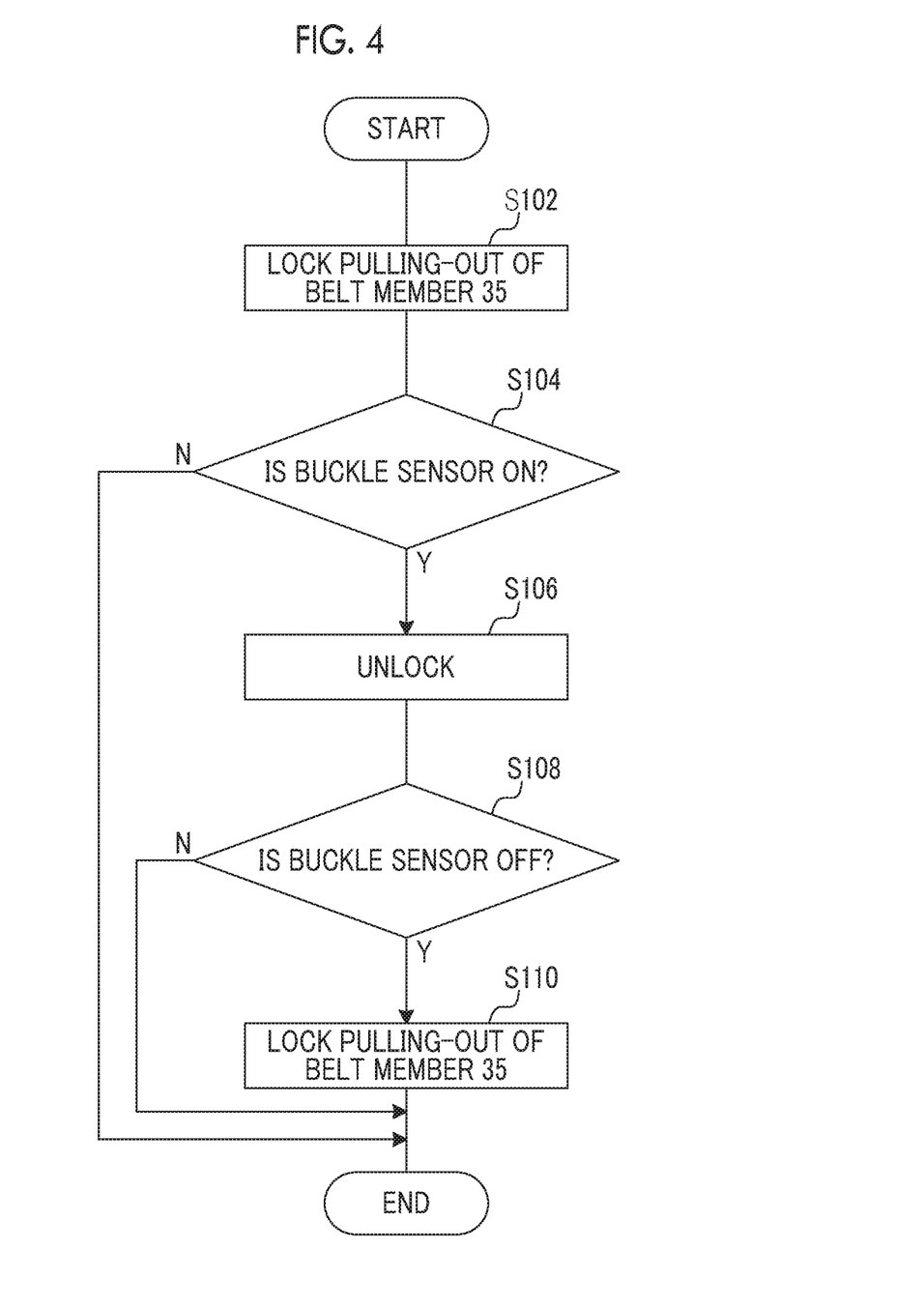
FIG. 4 is a flowchart showing lock switching processing in a case of restraining an occupant.

As shown in FIG. 4, in step S102, the CPU 52 causes the locking mechanism 62 to lock the pulling-out of the occupant belt member 35. That is, the locking mechanism 62 is switched to the locked state. In a case where the locking mechanism 62 is in the locked state, the locked state is maintained.

The CPU 52 determines whether or not the buckle sensor 64 of the wheelchair buckle 32 is ON in step S104. As the wheelchair tongue plate 33 is mounted on the wheelchair buckle 32, a signal is transmitted from the buckle sensor 64 to the ECU 50, and the CPU 52 determines that the buckle sensor 64 is ON. In a case where the wheelchair tongue plate 33 is not mounted on the wheelchair buckle 32, the CPU 52 determines that the buckle sensor 64 is OFF, that is, not ON.

In a case where the CPU 52 determines in step S104 that the buckle sensor 64 is ON, the CPU 52 transitions the processing to step S106. In a case where the CPU 52 determines in step S104 that the buckle sensor 64 is not ON, the CPU 52 ends the lock switching processing.

The CPU 52 releases the locked state by the locking mechanism 62 in step S106. Specifically, by energizing the solenoid, the locking lever is moved to cause the spool 34A of the occupant retractor 34 to enter the unlocked state. Accordingly, the spool 34A can be rotated, and the occupant belt member 35 can be pulled out from the occupant retractor 34.

Subsequently, the CPU 52 determines whether or not the buckle sensor 64 is OFF in step S108. That is, when the occupant P of the wheelchair 100 gets off, the occupant belt member 35 is detached, and thereafter the wheelchair tongue plate 33 securing the wheelchair 100 is detached from the wheelchair buckle 32. Accordingly, a signal is transmitted from the buckle sensor 64 to the ECU 50, and the CPU 52 determines that the buckle sensor 64 is OFF. In a case where the state in which the wheelchair tongue plate 33 is mounted on the wheelchair buckle 32 is maintained, the CPU 52 determines that the buckle sensor 64 maintains the ON state. That is, the CPU 52 determines that the buckle sensor 64 is not OFF.

In a case where the CPU 52 determines that the buckle sensor 64 is OFF in step S108, the CPU 52 transitions the processing to step S110. In a case where the CPU 52 determines that the buckle sensor 64 is not OFF in step S108, the CPU 52 ends the lock switching processing.

The CPU 52 ends the lock switching processing by causing the locking mechanism 62 to lock the pulling-out of the occupant belt member 35 in step S110. That is, the locking mechanism 62 is switched to the locked state so as not to cause the occupant belt member 35 to be pulled out from the occupant retractor 34.

Next, the lock switching processing in an emergency in a state where the occupant P is restrained will be described with reference to FIG. 5.

Figure 5:
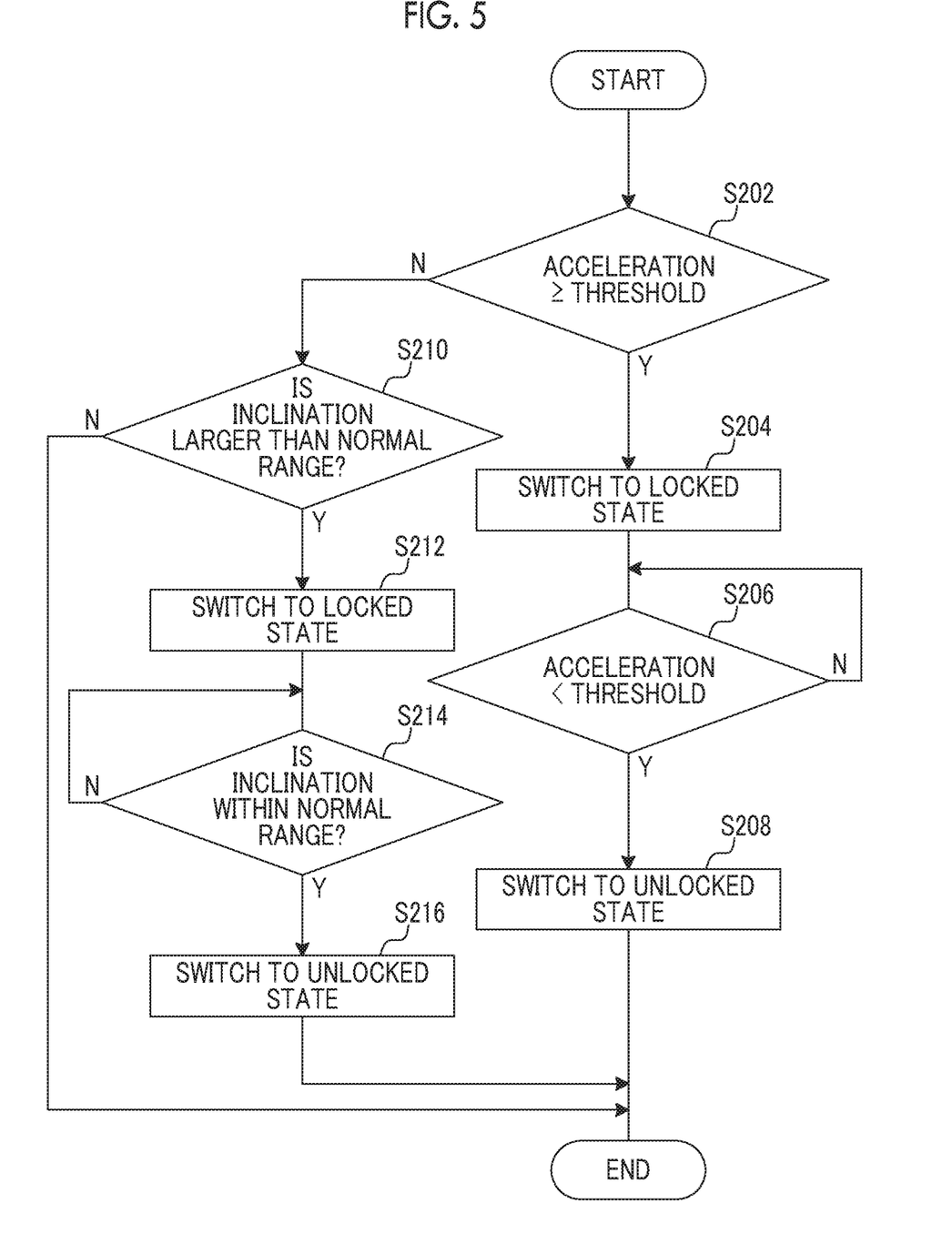
FIG. 5 is a flowchart showing the lock switching processing in an emergency in a state where the occupant is restrained.

As shown in FIG. 5, the CPU 52 determines whether or not the acceleration of the vehicle 12 is equal to or more than a predetermined threshold (predetermined value) in step S202. In a case where the acceleration (deceleration) of the vehicle 12 detected by the acceleration sensor 66 is equal to or more than the predetermined value, the CPU 52 transitions the processing to step S204. In a case where the acceleration (deceleration) of the vehicle 12 detected by the acceleration sensor 66 is less than the predetermined threshold, the CPU 52 transitions the processing to step S210.

In a case where the acceleration of the vehicle 12 is equal to or more than the predetermined value, the CPU 52 causes the locking mechanism 62 to lock the pulling-out of the occupant belt member 35 in step S204. That is, the locking mechanism 62 is electrically switched to cause the spool 34A to be in the locked state. By locking the pulling-out of the occupant belt member 35 in this manner, an inertial movement of the occupant P is suppressed.

Next, in step 206, the CPU 52 determines whether or not the acceleration of the vehicle 12 is less than the predetermined threshold (predetermined value). That is, in a case where the acceleration of the vehicle 12 detected by the acceleration sensor 66 has become less than the predetermined value, the CPU 52 transitions the processing to step S208. In a case where the acceleration of the vehicle 12 is not less than the predetermined threshold, that is, in a case where the acceleration of the vehicle 12 is maintained at the predetermined value or more, the CPU 52 repeats the processing of step S206.

The CPU 52 releases the locked state by the locking mechanism 62 in step S208. That is, by energizing the solenoid, the locking lever is moved to cause the spool 34A of the occupant retractor 34 to be in the unlocked state. Then, the lock switching processing is ended.

On the other hand, in a case where the acceleration of the vehicle 12 detected by the acceleration sensor 66 in step S202 is less than the predetermined threshold, the CPU 52 transitions the processing to step S210 as described above.

The CPU 52 determines whether or not the inclination of vehicle 12 is larger than a normal range in step S210. In the present embodiment, as an example, the angle (inclination) of the vehicle 12 with respect to the horizontal is calculated based on a signal from the acceleration sensor 66. In a case where the angle is equal to or more than a predetermined value, the CPU 52 determines that the inclination of the vehicle 12 is larger than the normal range, and transitions the processing to step S212. In a case where the angle of the vehicle 12 with respect to the horizontal is less than the predetermined value, the CPU 52 determines that the inclination of the vehicle 12 is within the normal range, and ends the lock switching processing. That is, in a case where the acceleration of the vehicle 12 is less than the predetermined value and the inclination of the vehicle 12 is within the normal range, the processing is ended without switching the locking mechanism 62.

The CPU 52 causes the locking mechanism 62 to lock the pulling-out of the occupant belt member 35 in step S212. That is, the locking mechanism 62 is electrically switched to cause the spool 34A to be in the locked state. By locking the pulling-out of the occupant belt member 35, an inertial movement of the occupant P is suppressed.

The CPU 52 determines whether or not the inclination of the vehicle 12 is within the normal range in step S214. In a case where the angle of the vehicle 12 with respect to the horizontal is less than the predetermined value, the CPU 52 determines that the inclination of the vehicle 12 is within the normal range, and transitions the processing to step S216. In a case where the angle is equal to or more than the predetermined value, the CPU 52 determines that the inclination of the vehicle 12 is larger than the normal range, and repeats the processing of step S214.

The CPU 52 releases the locked state by the locking mechanism 62 in step S216. That is, by energizing the solenoid, the locking lever is moved to cause the spool 34A of the occupant retractor 34 to be in the unlocked state. Then, the lock switching processing is ended.

Actions

Next, the actions of the present embodiment will be described.

In the wheelchair occupant restraint device 10 according to the present embodiment, as illustrated in FIGS. 1 and 2, when the wheelchair belt member 31 is pulled out from the wheelchair retractor 30 in a state where the wheelchair 100 is moved to the securing space S and the wheelchair tongue plate 33 is mounted on the wheelchair buckle 32 through the frame 100A of the wheelchair 100, the wheelchair 100 can be secured. In addition, when the occupant belt member 35 is pulled out from the occupant retractor 34 and the occupant tongue plate 37 is mounted on the occupant buckle 36 in a state where the wheelchair 100 is secured, the occupant P of the wheelchair 100 can be restrained.

Here, the occupant retractor 34 of the present embodiment is disposed on the same side as the wheelchair buckle 32 from the securing space S. Accordingly, after mounting the wheelchair tongue plate 33 on the wheelchair buckle 32, the occupant P can subsequently pull out the occupant belt member 35 from the occupant retractor 34. That is, the restraint of the occupant P can be performed smoothly, and the time needed for securing the wheelchair 100 and restraining the occupant P can be reduced.

In the present embodiment, as illustrated in FIG. 1, since the occupant retractor 34 and the occupant buckle 36 for restraining the occupant P are disposed above the wheelchair retractor 30 and the wheelchair buckle 32 for securing the wheelchair 100 in the vehicle up-down direction, the wheelchair belt member 31 is not in the way when the occupant P is restrained.

Furthermore, in the present embodiment, as illustrated in FIG. 2, the occupant retractor 34 and the occupant buckle 36 are disposed at positions farther from the securing space S than the wheelchair retractor 30 and the wheelchair buckle 32. Therefore, also in this respect, the wheelchair belt member 31 is not in the way when the occupant P is restrained, and the occupant P can be restrained smoothly.

Moreover, in the present embodiment, as described with reference to the flowchart of FIG. 4, the locked state of the occupant retractor 34 is released by the locking mechanism 62 by mounting the wheelchair tongue plate 33 on the wheelchair buckle 32. Accordingly, the wheelchair 100 needs to be secured before restraining the occupant P, and it is possible to suppress forgetting to secure the wheelchair 100.

In particular, in the present embodiment, since the structure in which the locking is electrically switched by the locking mechanism 62 is adopted, the structure can be simplified compared to a configuration in which the locking and unlocking of the occupant belt member 35 are mechanically switched. That is, the locking mechanism 62 can be reduced in size.

In addition, in the present embodiment, as described in the flowchart of FIG. 5, in a case where the acceleration (deceleration) acting on the vehicle 12 becomes equal to or more than the predetermined value, for example, at the time of a collision of the vehicle 12, the pulling-out of the occupant belt member 35 can be locked. In addition, even in a case where the angle (inclination) of the vehicle 12 with respect to the horizontal becomes equal to or more than the predetermined value due to travelling on a steep road or the like, the pulling-out of the occupant belt member 35 can be locked, and the occupant P of the wheelchair 100 can be favorably restrained. That is, the safety performance for the occupant P can be improved.

Furthermore, in the present embodiment, as illustrated in FIG. 1, the wheelchair retractor 30, the wheelchair buckle 32, the occupant retractor 34, and the occupant buckle 36 are attached to the belt fixing plate 20. Accordingly, the occupant P seated in the wheelchair 100 can pull out the wheelchair belt member 31 from the wheelchair retractor 30 with his/her own hand, and the occupant P can pull out the occupant belt member 35 from the occupant retractor 34.

In the present embodiment, a so-called two-point seat belt is used as the belt that restrains the occupant P, but the belt is not limited thereto. For example, the structure of a modification example illustrated in FIG. 6 may be adopted.

Modification Example

Figure 6:
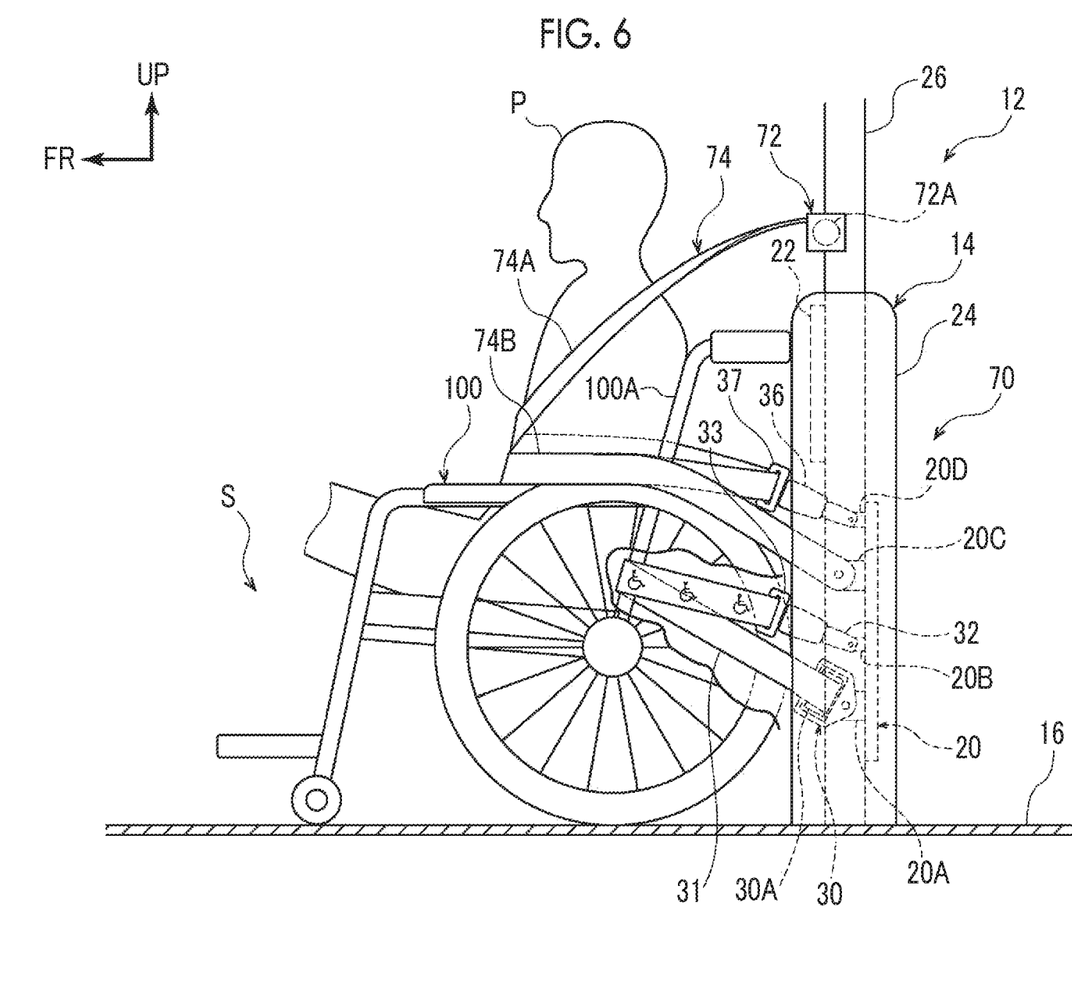
FIG. 6 is a side view corresponding to FIG. 1 and showing a modification example of the wheelchair occupant restraint device according to the embodiment.

As illustrated in FIG. 6, in a wheelchair occupant restraint device 70 of the present modification example, an occupant retractor 72 is attached to the handrail 26. The occupant retractor 72 is disposed above the support plate 22 in the vehicle up-down direction and includes a spool 72A. One end portion of an occupant belt member 74 is wound around the spool 72A so as to be pulled out. Since the spool 72A is urged by a return spring (not illustrated) in a direction in which the occupant belt member 74 is wound, the occupant belt member 74 is in a state of being wound around the occupant retractor 72 in a no-load state except for the other end portion.

In addition, the occupant retractor 72 has an emergency locking mechanism (emergency locking retractor (ELR)) in which pulling-out of the occupant belt member 74 is limited when the occupant belt member 74 is pulled out suddenly, such as at the time of a collision of the vehicle 12.

The other end portion of the occupant belt member 74 is fixed to the third attachment piece 20C of the belt fixing plate 20. That is, in the present modification example, the third attachment piece 20C functions as an anchor. The occupant tongue plate 37 is passed through the occupant belt member 74, and the occupant tongue plate 37 is mounted on the occupant buckle 36.

Here, the occupant belt member 74 is configured to include a shoulder belt portion 74A for restraining the state of the occupant P and a lap belt portion 74B for restraining the waist portion of the occupant P. That is, a portion of the occupant belt member 74 that is pulled out from the occupant retractor 72 and extends obliquely from the left shoulder to the right waist of the occupant P is the shoulder belt portion 74A. A portion of the occupant belt member 74 that extends in the vehicle width direction from the right waist to the left waist is the lap belt portion 74B.

As described above, in the present modification example, the occupant P is restrained by the three-point seat belt, and the safety performance of the occupant P can be further improved compared to the case where the occupant P is restrained by the two-point seat belt.

While the wheelchair occupant restraint devices according to the embodiment and the modification example have been described above, it is needless to say that the wheelchair occupant restraint devices can be implemented in various forms without departing from the gist of the present disclosure. For example, in the above embodiment and the modification example, as illustrated in FIG. 2, the occupant retractor 34 is disposed at a position farther from the securing space S than the wheelchair buckle 32, but the occupant retractor 34 is not limited thereto. For example, when the occupant retractor 34 is disposed at the same position as the wheelchair buckle 32 in the vehicle width direction above the wheelchair buckle 32 in the vehicle up-down direction, the wheelchair belt member 31 is not in the way when the occupant P is restrained. Alternatively, the occupant retractor 34 may be disposed at a position closer to the securing space S than the wheelchair buckle 32.

In addition, in the above embodiment and the modification example, as illustrated in FIG. 1, the occupant retractor 34 is disposed above the wheelchair buckle 32 in the vehicle up-down direction, but the occupant retractor 34 is not limited thereto. For example, when the occupant retractor 34 is disposed at the same height as the wheelchair buckle 32 in the vehicle up-down direction and at a position farther from the securing space S than the wheelchair buckle 32, the wheelchair belt member 31 is not in the way when the occupant P is restrained. Alternatively, the occupant retractor 34 may be disposed on the vehicle lower side from the wheelchair buckle 32.

Furthermore, in the above embodiment and the modification example, as shown in FIG. 3, the configuration in which the locking and unlocking of the occupant retractor 34 are electrically switched by the locking mechanism 62 using the solenoid and the locking lever is adopted, but the locking and unlocking of the occupant retractor 34 are not limited thereto. For example, the locking and unlocking of the occupant retractor 34 may be electrically switched using a motor or the like. Alternatively, a locking mechanism that mechanically switches locking and unlocking of the occupant belt member 35 may be provided. In this case, the locking and unlocking of the occupant belt member 35 can be switched even in a state where the power supply is cut off.

Furthermore, in the above embodiment and the modification example, the mark imitating a wheelchair is drawn on one surface of the wheelchair belt member 31, but the wheelchair belt member 31 is not limited thereto. For example, the wheelchair belt member 31 and the occupant belt member 35 may be distinguished from each other by a color or a pattern instead of the mark. Alternatively, the wheelchair belt member 31 may be formed narrower than the occupant belt member 35 so as to be distinguished.

The wheelchair buckle 32 and the occupant buckle 36 may adopt a misconnection prevention structure. That is, in a case where another occupant's seat is disposed next to the securing space S, the misconnection prevention structure may be adopted so that the occupant tongue plate 37 is not accidentally mounted on the buckle of the next seat. As such a misconnection prevention structure, a structure in which the width and depth of the insertion holes of the wheelchair buckle 32 and the occupant buckle 36 are changed may be adopted.

Furthermore, in the above embodiment and the modification example, the wheelchair retractor 30, the wheelchair buckle 32, the occupant retractor 34, and the occupant buckle 36 are disposed on the belt fixing plate 20, but are not limited thereto. For example, the wheelchair retractor 30 and the wheelchair buckle 32 may be disposed on the floor panel 16. Even in this case, as long as the occupant retractor 34 is disposed on the same side as the wheelchair buckle 32 from the securing space S, the time needed for securing the wheelchair 100 and restraining the occupant P by the caregiver or attendant of the occupant P can be reduced.

What is claimed is:

1. A wheelchair occupant restraint device comprising:
    a wheelchair retractor which is disposed on one side of a securing space for a wheelchair in a vehicle cabin, and around which one end portion of a wheelchair belt member is wound so as to be pulled out;
    a wheelchair buckle which is disposed on an opposite side of the securing space from the wheelchair retractor, and on which a wheelchair tongue plate attached to an other end portion of the wheelchair belt member is able to be mounted;
    an occupant retractor which is disposed on the opposite side of the securing space from the wheelchair retractor, and around which one end portion of an occupant belt member is wound so as to be pulled out; and
    an occupant buckle which is disposed on an opposite side of the securing space from the occupant retractor, and on which an occupant tongue plate attached to the other end portion of the occupant belt member is able to be mounted.

2. The wheelchair occupant restraint device according to claim 1, wherein the occupant retractor and the wheelchair buckle are disposed at different heights in a vehicle up-down direction.

3. The wheelchair occupant restraint device according to claim 1, wherein the occupant retractor and the wheelchair buckle are disposed at different positions with respect to the securing space.

4. The wheelchair occupant restraint device according to claim 1, further comprising:
    a buckle sensor configured to detect that the wheelchair tongue plate is mounted on the wheelchair buckle; and
    a locking mechanism configured to lock and unlock pulling-out of the occupant belt member from the occupant retractor,
    wherein, in a case where the buckle sensor detects that the wheelchair tongue plate is mounted on the wheelchair buckle, the occupant belt member is able to be pulled out by the locking mechanism.

5. The wheelchair occupant restraint device according to claim 4, wherein the locking mechanism is configured to electrically switch between locking and unlocking of the occupant belt member.

6. The wheelchair occupant restraint device of claim 5, further comprising an acceleration sensor configured to electrically detect an acceleration acting on a vehicle,
    wherein the occupant retractor is configured to lock the pulling-out of the occupant belt member in at least one of a case where the acceleration detected by the acceleration sensor is equal to or more than a predetermined value, and a case where an angle of the vehicle with respect to a horizontal is equal to or more than a predetermined value.

7. The wheelchair occupant restraint device according to claim 1, wherein the wheelchair retractor and the occupant retractor are disposed on a standing member standing in the vehicle cabin at a height configured to be within a reaching distance of a hand of an occupant seated in the wheelchair.

8. The wheelchair occupant restraint device according to claim 1, wherein the occupant retractor is disposed on the opposite side of the securing space in a right-left direction from the wheelchair retractor.

9. The wheelchair occupant restraint device according to claim 2, wherein the occupant retractor is disposed above the wheelchair buckle in the vehicle up-down direction.

10. The wheelchair occupant restraint device according to claim 3, wherein the occupant retractor is disposed at a position farther from the securing space than the wheelchair buckle.

11. The wheelchair occupant restraint device according to claim 3, wherein the occupant buckle is disposed at a position farther from the securing space than the wheelchair retractor.

12. The wheelchair occupant restraint device according to claim 7, wherein the wheelchair buckle and the occupant buckle are configured to be within the reaching distance of the hand of the occupant seated in the wheelchair.

13. The wheelchair occupant restraint device according to claim 1, wherein a mark imitating a wheelchair is drawn on one surface of the wheelchair belt member.

14. The wheelchair occupant restraint device according to claim 4, further comprising:
    a central processing unit configured to determine whether the buckle sensor is OFF, in a case where the central processing unit determines that the buckle sensor is OFF, the central processing unit causes the locking mechanism to lock the pulling-out of the occupant belt member.

* * * * *